US012078387B2

(12) United States Patent
Song et al.

(10) Patent No.: US 12,078,387 B2
(45) Date of Patent: Sep. 3, 2024

(54) HOT WATER TANK FOR BIDET AND BIDET DEVICE INCLUDING THE SAME

(71) Applicant: COWAY CO., LTD., Gongju-si (KR)

(72) Inventors: Minsu Song, Seoul (KR); Hyun Kang Lee, Seoul (KR); Youngpyo Kim, Seoul (KR); Dong Ik Nam, Seoul (KR); Moon Seok Koh, Seoul (KR); Min Hwan Kim, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 743 days.

(21) Appl. No.: 17/284,189

(22) PCT Filed: Sep. 19, 2019

(86) PCT No.: PCT/KR2019/012136

§ 371 (c)(1),
(2) Date: Apr. 9, 2021

(87) PCT Pub. No.: WO2020/075983

PCT Pub. Date: Apr. 16, 2020

(65) Prior Publication Data

US 2021/0341178 A1 Nov. 4, 2021

(30) Foreign Application Priority Data

Oct. 11, 2018 (KR) ........................ 10-2018-0121347

(51) Int. Cl.
*F24H 1/20* (2022.01)
*E03D 9/08* (2006.01)
(Continued)

(52) U.S. Cl.
CPC ............... *F24H 1/201* (2013.01); *E03D 9/08* (2013.01); *F24H 9/20* (2013.01); *H05B 1/0213* (2013.01);
(Continued)

(58) Field of Classification Search
CPC ..... H05B 1/0213; F24H 15/25; F24H 15/128; F24H 15/223; F24H 15/37; F24H 9/20; F24H 1/201; E03D 9/08
See application file for complete search history.

(56) References Cited

U.S. PATENT DOCUMENTS

2007/0166017 A1* 7/2007 Kwon ..................... F24H 1/121
392/456
2016/0090724 A1 3/2016 Yang et al.

FOREIGN PATENT DOCUMENTS

JP 5-239857 A 9/1993
KR 20-0358234 Y1 8/2004
(Continued)

OTHER PUBLICATIONS

Machine Translation of Seo (KR 10-2007-0101626), performed on Jan. 26, 2024 (Year: 2007).*
(Continued)

*Primary Examiner* — Brian W Jennison
(74) *Attorney, Agent, or Firm* — Oblon, McClelland, Maier & Neustadt, L.L.P.

(57) ABSTRACT

A hot water tank for a bidet includes a tank main body in which a space for accommodating water is formed and an inclined surface having a portion of an upper side inclined downward is formed. The hot water tank also includes a heating unit inserted into and positioned in the tank main body and a bimetal positioned on the inclined surface.

5 Claims, 6 Drawing Sheets

(51) Int. Cl.

| | |
|---|---|
| ***F24H 9/20*** | (2022.01) |
| ***F24H 15/128*** | (2022.01) |
| ***F24H 15/223*** | (2022.01) |
| ***F24H 15/25*** | (2022.01) |
| ***F24H 15/37*** | (2022.01) |
| ***H05B 1/02*** | (2006.01) |

(52) U.S. Cl.
CPC .......... *F24H 15/128* (2022.01); *F24H 15/223* (2022.01); *F24H 15/25* (2022.01); *F24H 15/37* (2022.01)

(56) References Cited

FOREIGN PATENT DOCUMENTS

| | | | |
|---|---|---|---|
| KR | 10-2005-0002732 | A | 1/2005 |
| KR | 10-2007-0101626 | A | 10/2007 |
| KR | 20-2012-0004031 | U | 6/2012 |
| KR | 10-1637210 | B1 | 7/2016 |
| KR | 10-2017-0101441 | A | 9/2017 |

OTHER PUBLICATIONS

International Search Report issued on Dec. 30, 2019 in PCT/KR2019/012136 filed on Sep. 19, 2019, citing documents AA and AO-AR therein, 2 pages.

* cited by examiner

HOT WATER TANK FOR BIDET AND BIDET DEVICE INCLUDING THE SAME

TECHNICAL FIELD

The present disclosure relates to a hot water tank for a bidet and a bidet device including the same.

BACKGROUND ART

A toilet seat is a device that allows a user to sit and to go to the toilet. Recently, there have been many cases of installing a bidet device on the toilet seat, and the bidet device is installed on the upper side of the toilet. Such a bidet for a toilet seat includes a hot water tank that stores supplied water and heats the water to a certain temperature, a nozzle unit that sprays heated hot water to perform cleaning, and a drying device that performs drying after cleaning.

The hot water tank includes a tank main body in which supplied water is stored, a heater for heating water stored in the tank main body, and a sensor for detecting a temperature inside a tank.

Patent Document 1 discloses a hot water tank for a bidet. The hot water tank for a bidet disclosed in Patent Document 1 includes a main body in which supplied water is accommodated, a heater located inside the main body, and a temperature sensor installed on the upper part of the main body.

However, in the case of Patent Document 1, because the heater is located at the bottom of the main body and the temperature sensor is installed on the upper part of the main body, there is a difference between the actual temperature of the heater or the received water and the temperature of the water detected by the temperature sensor, so that it is difficult for control by the temperature sensor to be accurately performed. In this case, when the heater is not blocked by the temperature sensor even though the water in the hot water tank is overheated, there is a risk of a burn or the like to the user.

(Patent Document 1) KR 2012-0004031 U

DETAILED DESCRIPTION OF THE INVENTION

Technical Problem

The present disclosure provides a hot water tank in which the temperature of a heater in the hot water tank or the temperature of stored water can be accurately detected.

The present disclosure also provides a hot water tank having excellent durability.

Technical Solution

According to an aspect of the present disclosure, there is provided a hot water tank for a bidet, the hot water tank including: a tank main body in which a space for accommodating water is formed and an inclined surface having a portion of an upper side inclined downward is formed; a heating unit inserted into and positioned in the tank main body; and a bimetal positioned on the inclined surface.

The heating unit may have a rectangular outer periphery of a cross-section, and a corner portion of the rectangular shape is inclined toward the bimetal.

The hot water tank may further include: a fastening member configured to couple the bimetal to the tank main body and being inserted into an inside of the tank main body from an outside of a periphery of the bimetal so that the bimetal is coupled to the tank main body; a protrusion formed on an inner circumferential surface of an upper part of the tank by using the fastening member; and a bubble preventing portion positioned at a stepped portion formed between the protrusion and the inner circumferential surface of the upper part of the tank.

The hot water tank may further include a fixing plate positioned between the fastening member and the bimetal, wherein the fixing plate may be made of a stainless material.

The hot water tank may further include a drain groove positioned in one side of the bimetal.

According to another aspect of the present invention, there is provided a bidet device including the hot water tank for a bidet.

Effects of the Invention

According to a hot water device for a bidet and a bidet device including the same according to the present disclosure, a separation distance between a bimetal and a heating unit is minimized so that the bimetal can be accurately operated. In addition, damage to the bimetal due to moisture inflow or condensation in a bidet main body is prevented so that the durability and life of the bimetal can be increased.

MODE OF THE INVENTION

Figure 1:
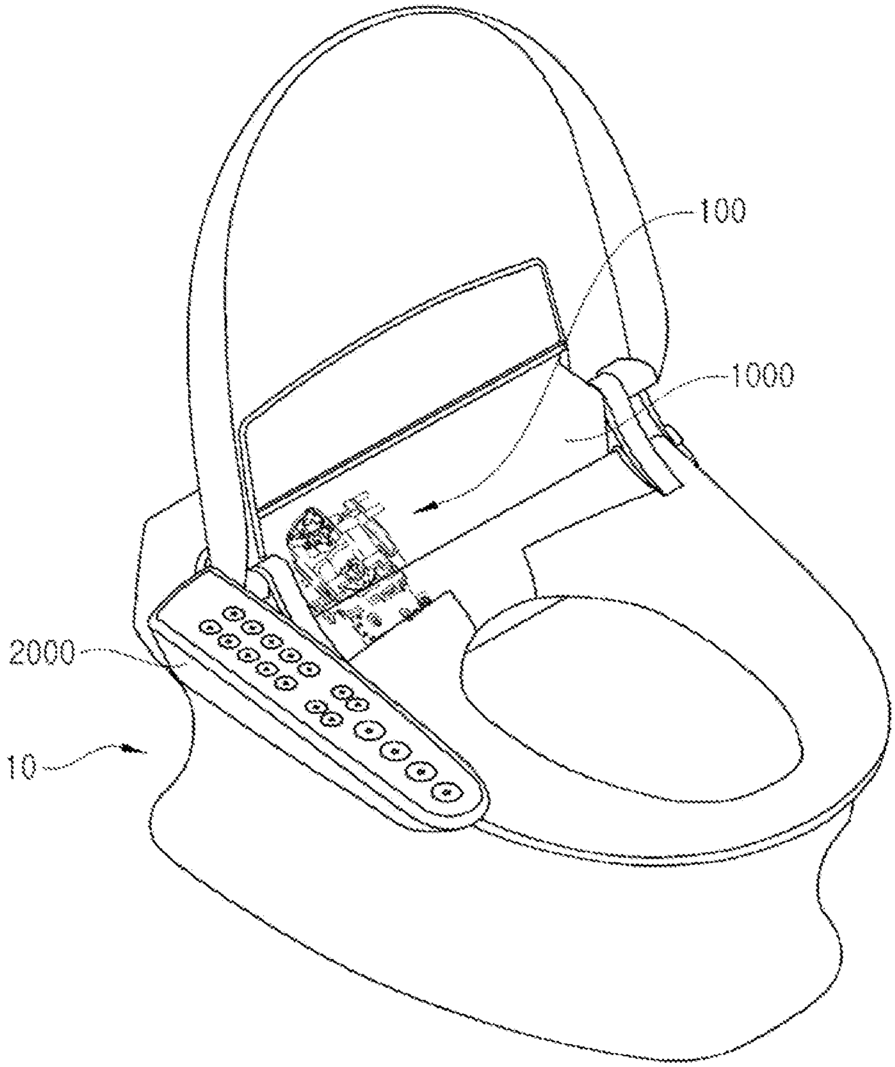
FIG. 1 is a perspective view of a bidet device according to an embodiment.

The above objectives, features, and other advantages of the present disclosure will become more apparent by describing in detail embodiments of the present invention with reference to the accompanying drawings. In this procedure, the thicknesses of lines or the sizes of components shown in the drawings may be exaggerated for clarity and convenience of description. In addition, terms to be described later are terms defined in consideration of functions in the present disclosure, which may vary according to the intention or practice of users or operators. Therefore, definitions of these terms should be described based on the contents throughout the present specification.

In addition, embodiments to be described are provided illustratively for the description of the present disclosure and do not limit the technical scope of the present disclosure.

Each component constituting a hot water tank for a bidet and a bidet device according to the present disclosure may be used integrally or separately, as necessary. In addition, depending on the type of use, some components may be omitted and used.

Hereinafter, a bidet device according to an embodiment of the present disclosure will be described in detail with reference to the accompanying drawings.

First, the configuration of the bidet device will be described with reference to FIG. 1.

The bidet device includes a bidet main body 1000 and an operation unit 2000 installed on a toilet main body 10.

The hot water tank according to an embodiment of the present disclosure is installed inside the bidet main body 1000 at one side, and water is introduced into the hot water tank by the operation of the operation unit 2000 and stored in the hot water tank, or the stored water is discharged.

In addition, a nozzle unit (not shown) that sprays water discharged from the hot water tank to the anus or a local part of a user to be cleaned, a drying unit that performs drying by discharging wind after cleaning, and a control unit (not shown) that controls each component are provided inside the bidet main body 1000, and the configuration of the nozzle unit, the drying unit, and the control unit is known through bidet devices according to the related art, and thus a detailed description thereof will be omitted.

Hereinafter, a hot water tank 100 for a bidet according to an embodiment of the present disclosure will be described in detail with reference to FIGS. 2 through 6.

The hot water tank 100 for a bidet according to an embodiment of the present disclosure includes a tank main body 110, a heating unit 150, and a bimetal 120.

Figure 2:
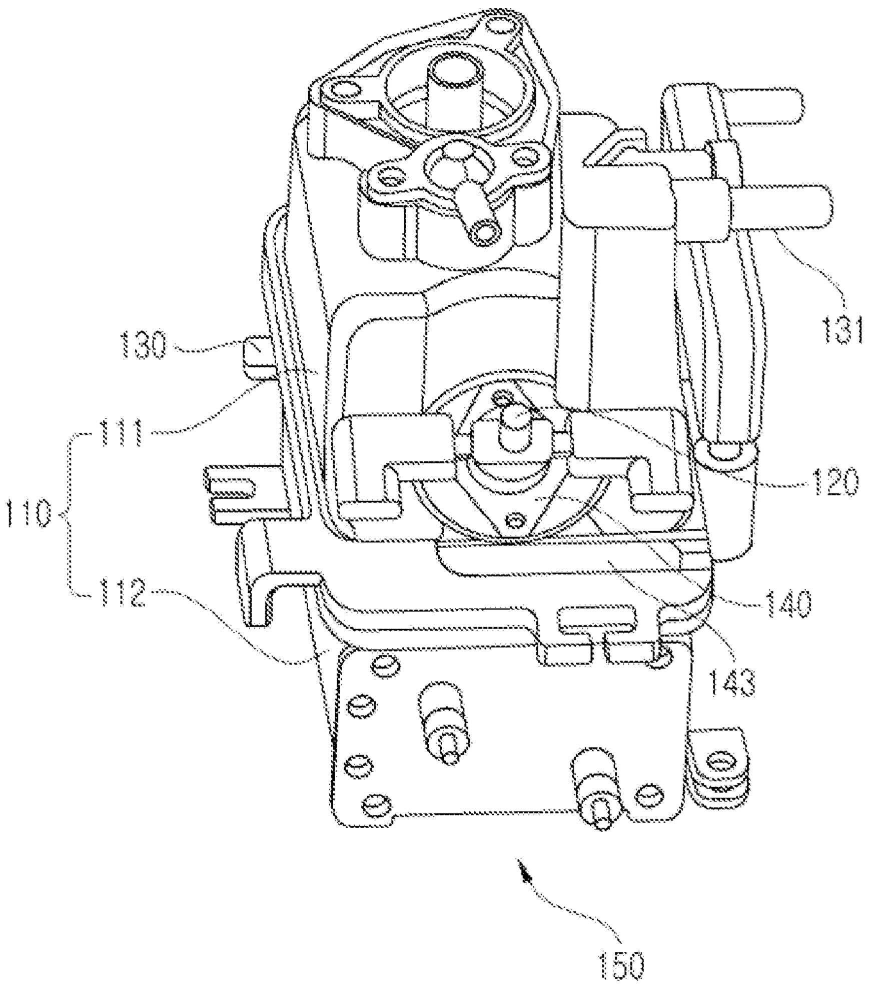
FIG. 2 is a perspective view of a hot water device for a bidet according to an embodiment.

The tank main body 110 is configured in the shape of a hollow tank in which water is accommodated. As shown in FIG. 2, the tank main body 110 may be configured in a shape in which an upper housing 111 and a lower housing 112 are combined with each other, but the present disclosure is not limited thereto.

Water may be introduced through an inlet 130 located on one side of the upper housing 111 and stored, and then water may be discharged through an outlet 131 located on one side of the lower housing 112.

As described above, the water that flows out is sprayed from the nozzle unit (not shown) connected to the outlet 131 to the user outside the bidet main body 1000.

Figure 3:
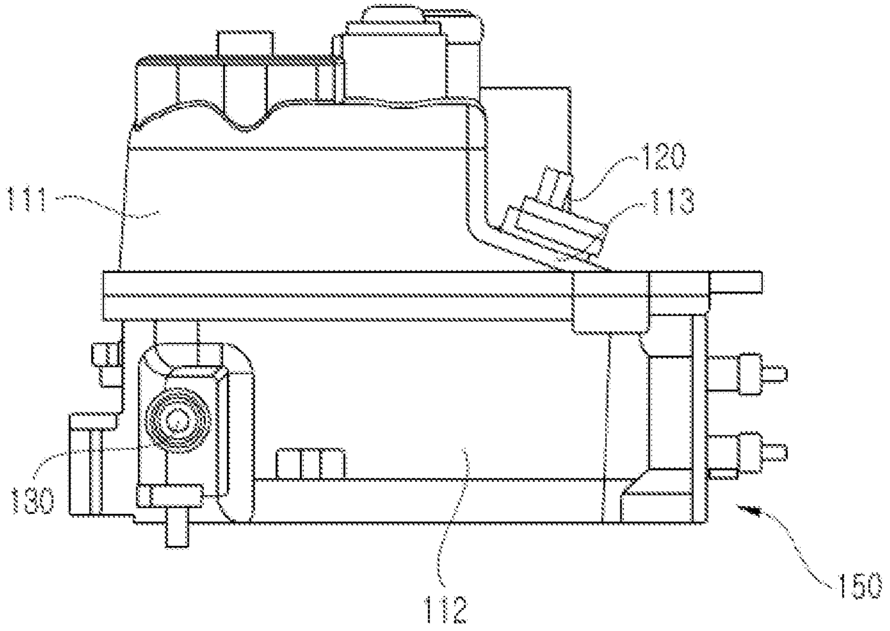
FIG. 3 is one side view of a hot water device for a bidet according to an embodiment.

As shown in FIG. 3, an inclined surface 113 in which an upper part of the tank main body 110, i.e., a portion of the upper housing 111, is inclined downward, is formed. In this way, the inclined surface 113 is formed so that a distance between an upper surface of a tank and an inner side of the tank can be reduced, and thus a separation distance between the bimetal 120 and the heating unit 150 to be described later can be reduced.

The bimetal 120 is installed on the upper side of the tank main body 110. Specifically, the bimetal 120 is installed on the inclined surface 113 formed on the upper housing 111.

The bimetal 120 is configured to cut off power to operate the heating unit 150 when the temperature in the tank main body 110 is greater than or equal to a set temperature.

The bimetal 120 is installed on the inclined surface 113 of the upper housing 111 by using a fastening member. Specifically, a fixing plate 140 that fixes the periphery of the bimetal 120 is interposed between the bimetal 120 and the upper housing 111, and the fastening member penetrates the fixing plate 140 and is inserted into the upper housing 111, so that the bimetal 120 is fixedly installed on the inclined surface 113 of the upper housing 111.

Figure 6:
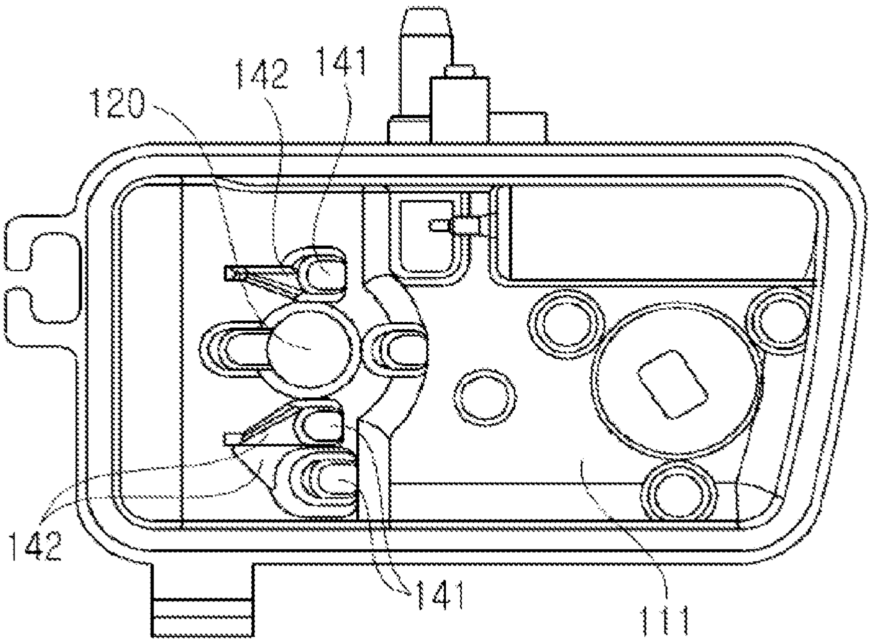
FIG. 6 is a diagram as viewed from a lower side (inner side) of an upper housing of a hot water device for a bidet according to an embodiment.

As shown in FIG. 6, a protrusion 141 is formed inside the inclined surface 113 of the upper housing 111 by using the fastening member inserted into the upper housing 111, and a stepped portion is formed on the protrusion 141 and an upper part of an inner circumferential surface of the upper housing 111.

Accordingly, bubbles are formed in the water surface of the water stored in the tank main body 110 and the stepped portion, so that the temperature inside the tank is difficult to transfer to the bimetal 120.

A bubble preventing portion 142 is positioned at the stepped portion between the protrusion 141 and the upper housing 111, as described above, and is installed to fill a step height. Thus, the generation of bubbles between the water stored in the tank main body 110 and the stepped portion is suppressed.

In addition, the fixing plate 140 may be made of stainless steel. In the case of the inside of a bidet main body, moisture flows in, and condensation occurs due to the introduced moisture. According to the related art, brass was used as the material of the fixing plate 140, but in the case of brass, it is easily corroded by condensation generated as described above. In the present embodiment, the fixing plate 140 is made of stainless steel so that the corrosion of the fixing plate 140 can be prevented.

However, in the case of stainless steel, thermal conductivity is lower than that of brass, so that the temperature transfer to the bimetal 120 may be slightly lowered, but the fixing plate 140 may be thinner than the brass fixing plate 140 made of about 5 mm in thickness, preferably, about 3 mm in thickness, so that temperature transfer decrease can be prevented.

A drain groove 143 is located in one side of the bimetal 120 so that the outer circumferential surface of the upper housing 111 is inclined. Thus, water generated by condensation or water flowing into the bimetal 120 are quickly drained through the drain groove 143 so that the corrosion of the bimetal 120 can be prevented.

The heating unit 150 is located inside the tank main body 110. Specifically, the heating unit 150 is inserted from one side of the lower housing 112 of the tank main body 110 and is located inside the lower housing 112.

The water stored in the tank main body 110 is heated by the heating unit 150, and the heated water, as hot water, is sprayed to the nozzle unit through the outlet 131.

The heating unit 150 may be formed of a heating coil or the like that generates heat by applying power, but the present disclosure is not limited thereto. However, as shown in the comparative example of FIG. 4 and the embodiment of FIG. 5, a cross-section viewed from one side may be configured to have a substantially rectangular shape (refer to the broken line in the drawing), and in this specification, the shape of the heating unit is simply called a "rectangle".

Figure 5:
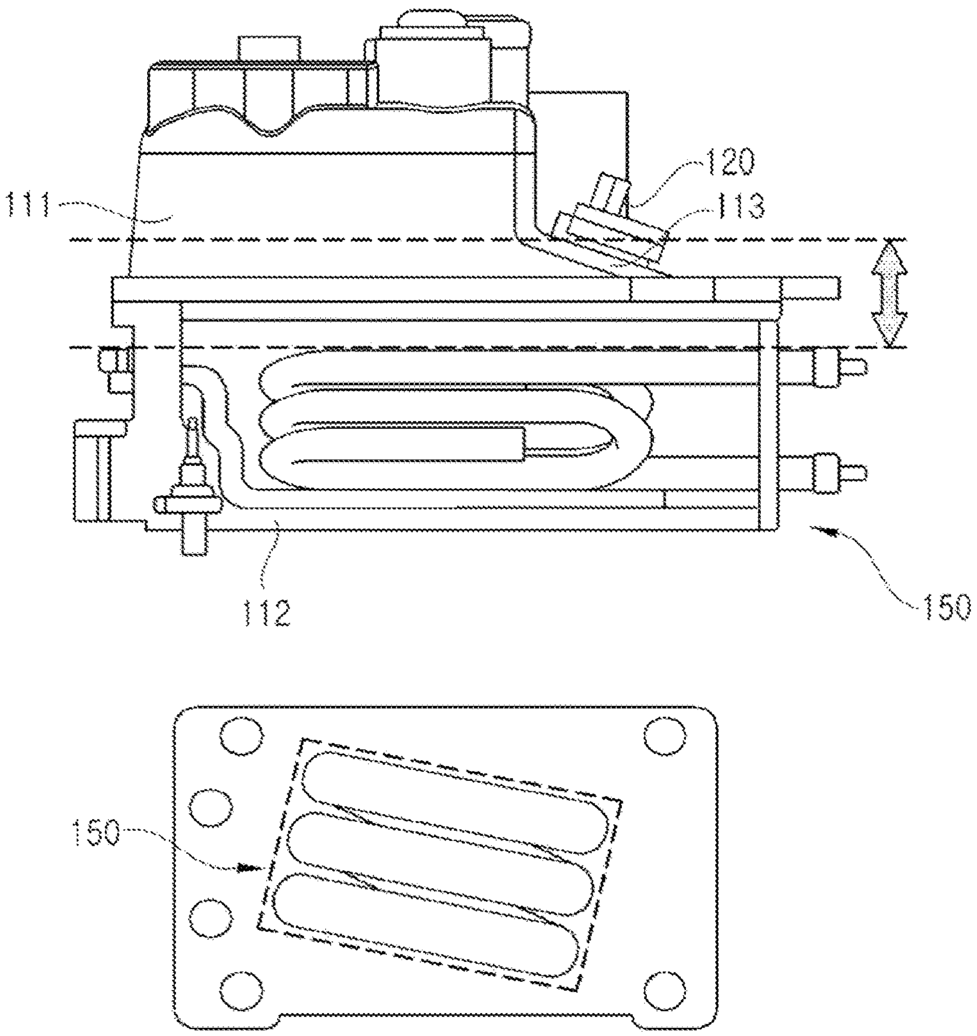
FIG. 5 is a side view of a hot water device for a bidet according to an embodiment, which illustrates the shape and the arrangement of a heating unit inside a tank.

As shown in FIG. 5, the heating unit 150 is positioned in a form in which the corner portion of the rectangular shape is inclined toward the bimetal 120.

Next, the effect of each of the above-described configurations will be described in detail.

In the hot water tank 100 for a bidet having the bimetal 120, in order to block overheating of the heating unit 150 by using the bimetal 120, the bimetal 120 is as close to the heating unit 150 as possible, and it is significant that the actual temperature of the heating unit 150 or the temperature of water heated by the heating unit 150 is transferred to the bimetal 120 without error.

As shown in FIG. 3, in the hot water tank 100 for a bidet according to the present embodiment, the inclined surface 113 is formed on the top of the tank main body 110 so that the bimetal 120 can be installed, and a separation distance between the bimetal 120 and the heating unit 150 can be primarily reduced.

Figure 4:
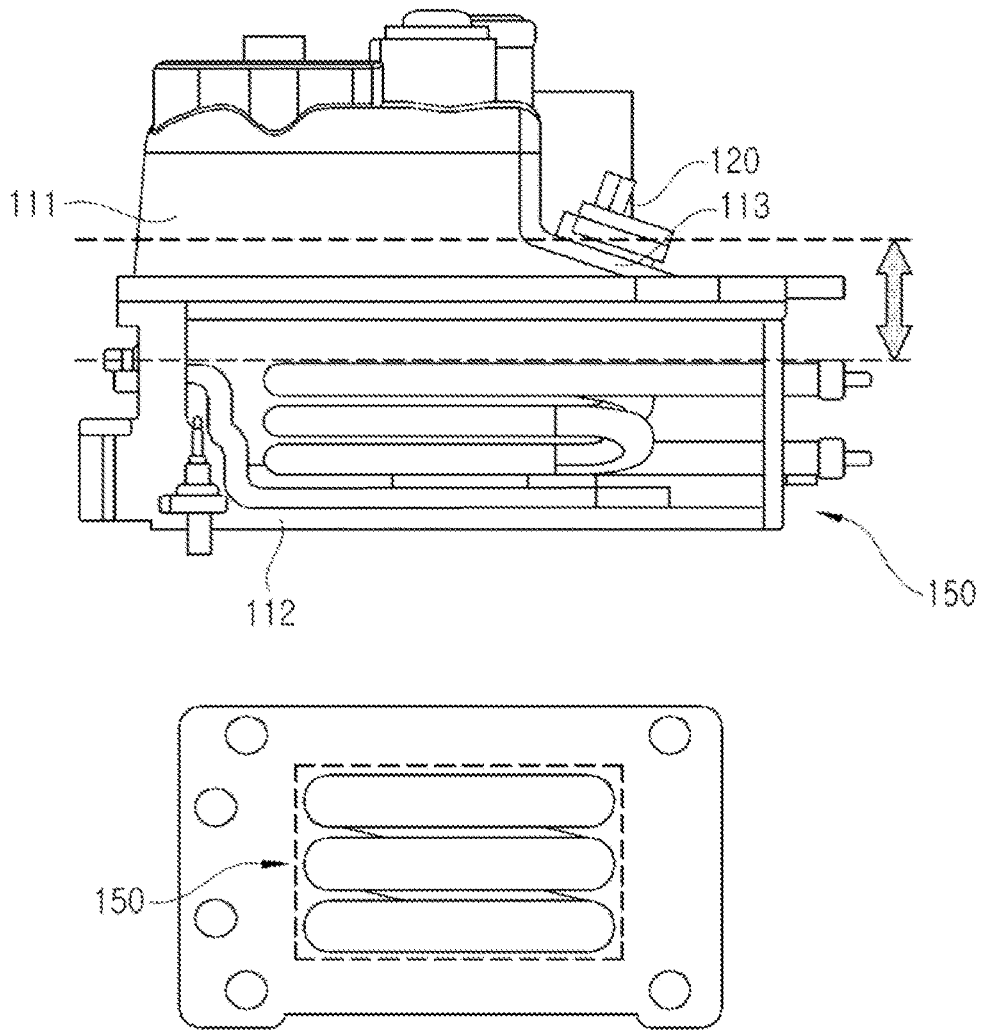
FIG. 4 is a side view of a hot water device for a bidet according to a comparative example, which illustrates the shape and the arrangement of a heating unit inside a tank.

As shown in the comparative example of FIG. 4, rather than configuring the side portion of the heating unit 150 having a substantially rectangular cross-sectional shape to face the bimetal 120, as in the embodiment shown in FIG. 5, the rectangular corner portion of the heating unit 150 forming a substantially rectangular cross-sectional shape is inclined toward the bimetal 120 so that the separation distance between the bimetal 120 and the heating unit 150 can be minimized.

In addition, the generation of bubbles in the stepped portion between the water surface of the tank main body 110 and the bimetal 120 is suppressed through the above-described bubble preventing portion 142, and the thickness of the fixing plate 140 is reduced so that heat transfer from the heating unit 150 to the bimetal 120 can be smoothly performed, and the function of the bimetal 120 due to overheating of the heating unit 150 is fully exhibited so that when the heating unit 150 is overheated, the function of the heating unit 150 can be quickly blocked through the bimetal 120.

In addition, when water flows into the bimetal 120, water is drained through the drain groove 143 so that the corrosion of the bimetal 120 is suppressed to allow extension of the life of the bimetal 120.

According to a hot water device for a bidet and a bidet device including the same according to the present disclosure, a separation distance between a bimetal and a heating unit is minimized so that the bimetal can be accurately operated. In addition, damage to the bimetal due to moisture inflow or condensation in a bidet main body is prevented so that the durability and life of the bimetal can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

EXPLANATION OF REFERENCE NUMERALS

100: hot water tank for bidet
110: tank main body
111: upper housing
112: lower housing
113: inclined surface
120: bimetal
130: inlet
131: outlet
140: fixing plate
141: protrusion
142: bubble preventing portion
143: drain groove
150: heating unit

The invention claimed is:

1. A hot water tank for a bidet, the hot water tank comprising:

a tank main body in which a space for accommodating water is formed and an inclined surface having a portion of an upper side inclined downward is formed;

a heating unit inserted into and positioned in the tank main body;

a bimetal positioned on the inclined surface;

a fastening member configured to couple the bimetal to the tank main body and being inserted into an inside of the tank main body from an outside of a periphery of the bimetal so that the bimetal is coupled to the tank main body;

a protrusion formed on an inner circumferential surface of an upper part of the tank main body by using the fastening member; and a bubble preventing portion positioned at a stepped portion formed between the protrusion and the inner circumferential surface of the upper part of the tank main body.

2. The hot water tank of claim 1, wherein the heating unit has a rectangular outer periphery of a cross-section, and a corner portion of the rectangular shape is inclined toward the bimetal.

3. The hot water tank of claim 1, further comprising a fixing plate positioned between the fastening member and the bimetal, wherein the fixing plate is made of a stainless material.

4. The hot water tank of claim 1, further comprising a drain groove positioned in one side of the bimetal.

5. A bidet device comprising the hot water tank for a bidet according to claim 1.

* * * * *